United States Patent [19]

Schulz

[11] Patent Number: 4,581,446

[45] Date of Patent: Apr. 8, 1986

[54] PURIFICATION OF CELLULOSE ETHERS

[75] Inventor: Gary J. Schulz, Midland, Mich.

[73] Assignee: The Dow Chemical Company, Midland, Mich.

[21] Appl. No.: 712,287

[22] Filed: Mar. 15, 1985

[51] Int. Cl.$^4$ .............................................. C08B 11/20
[52] U.S. Cl. ........................................ 536/85; 536/87; 536/91
[58] Field of Search ............................. 536/85, 87, 91

[56] References Cited

U.S. PATENT DOCUMENTS

| | | | |
|---|---|---|---|
| 3,448,100 | 6/1969 | Callihan et al. | 536/91 |
| 3,453,261 | 7/1969 | Scherff | 536/91 |
| 4,229,572 | 10/1980 | Zweigle | 536/85 |
| 4,296,235 | 10/1981 | Ziche | 536/91 |
| 4,404,370 | 9/1983 | Bernert et al. | 536/85 |

FOREIGN PATENT DOCUMENTS 254003 3/1963 Australia .............................. 536/91

*Primary Examiner*—Ronald W. Griffin

[57] ABSTRACT

Impurities in cellulose ether compositions are removed by providing a functionally effective thickness of a cellulose ether composition to a filtration device, and contacting the thickness, in a manner such that substantial thickness is maintained with at least one extracting solution in which the impurities in the cellulose ether are soluble such that a gradient impurity concentration is formed. High purity cellulose ethers are prepared, without experiencing large product losses.

31 Claims, No Drawings

PURIFICATION OF CELLULOSE ETHERS

BACKGROUND OF THE INVENTION

This invention relates to a process for removing impurities from cellulose ether compositions.

Cellulose ethers are a wide variety of polymers derived from cellulose. Such polymers can be water-soluble, organo-soluble or both. These polymers are useful in a wide variety of applications, for example, as thickeners in aqueous or organic liquids, film formers, and binders in the pharmaceutical and food fields.

Typically, cellulose ethers are prepared by reacting alkali cellulose with one or more etherifying agents. The etherifying agents are generally alkylhalides, alkylene oxides, halocarboxylic acids or dialkyl sulfates. The etherifying agents are highly reactive, and can form impurities upon reacting with each other, water, and the alkali on the cellulose. The impurities formed in these side reactions must be removed before the cellulose ether can be employed in end uses, for example, in the pharmaceutical and food fields.

In view of the fact that many water-soluble cellulose ethers are insoluble in hot water, the impurities in the final product can be removed by washing the cellulose ether product in hot water at a temperature above the gel point, i.e., the temperature at which the cellulose ether precipitates. Typically, such a procedure is performed by spreading the cellulose ether product on a large filter, and then spraying the product with hot water. However, an amount of the cellulose ether remains soluble in the hot water. Moreover, for those cellulose ethers which have gel points close to the boiling point of water at standard pressure, a larger portion of the cellulose ether remains soluble. The portion of the cellulose ether which remains soluble is washed away in the hot water wash causing product loss. For example, it is typical to lose about 20 to about 30 percent of low viscosity hydroxypropyl methylcellulose and about 5 to about 9 percent of high viscosity hydroxypropyl methylcellulose. The low viscosity species experience higher losses because a larger portion is soluble in water at any given temperature.

The problem of product loss in the hot water washing process is aggravated by the fact that a large quantity of water is required to remove the desired amount of impurities. Typically, from about 7 to about 20 parts of water are required to remove one part of the impurities. This large amount of water removes a correspondingly large amount of cellulose ether product along with the impurities. Additionally, when this large amount of water containing the impurities and products is discharged, large costs are incurred to decontaminate it.

Recently, in U.S. Pat. No. 4,404,370 it has been disclosed that cellulose ethers can be purified in a countercurrent process. In such a process, a suspension of cellulose ether is dropped onto a conveyor belt, and washed continuously with a water/alcohol purifying agent. The purifying agent is sprayed onto the cellulose ether from a number of ports, and filtered off. Some of the filtered purifying agent is recycled, and used as the purifying agent at a different port. Such a process has the advantage of efficient use of the purifying agent, but does not provide a means for controlling other process parameters such as temperature and pressure, and requires the addition of a purifying agent which is different from the suspension agent.

In view of the disadvantages of known methods, it is desirable to provide a process for removing impurities from cellulose ether compositions in an efficient, versatile wash system, in which substantial amounts of the impurities are removed without experiencing substantial cellulose ether product losses.

SUMMARY OF THE INVENTION

This invention is such a process. This invention is a process for removing solvent-soluble impurities from a cellulose ether composition. The process comprises providing a functionally effective thickness of a cellulose ether composition in a filtration device. The cellulose ether composition is contacted with an extracting solution comprising a solvent for the impurities, in a manner such that the extracting solution can migrate through the cellulose ether composition and through the filtration device. The extracting solution is allowed to migrate through the thickness of the cellulose ether composition such that substantial thickness of the cellulose ether is maintained in the filtration device, and a gradient impurity concentration is effected through the thickness of the cellulose ether composition.

Surprisingly, the process of this invention provides the skilled artisan with a means for removing impurities from cellulose ether compositions in an efficient, versatile wash system, in which substantial amounts of the impurities are removed without experiencing substantial cellulose ether product losses.

Cellulose ether compositions in which the impurities have been removed by the process of this invention are useful in conventional purified cellulose ether applications, such as binders and thickeners in aqueous and organic liquids, film formers, and in pharmaceutical and food uses.

DETAILED DESCRIPTION OF THE INVENTION

The invention is useful in removing impurities from all known cellulose ether compositions, for example, methylcellulose, hydroxypropyl methylcellulose, hydroxyethyl methylcellulose, hydroxybutylmethyl cellulose, ethyl cellulose, carboxymethyl cellulose and the like. Cellulose ethers can be prepared from any of the known methods, such as those disclosed in, for example, U.S. Pat. Nos. 3,342,805; 3,388,082; 3,709,876; 4,477,657 and the like. Low molecular weight, low viscosity cellulose ethers (less than about 10,000 cps) especially find the process of the invention useful. Generally, the molecular weight of the cellulose ether is determined by the molecular weight of the cellulose pulp employed in its preparation. The molecular weight can also be controlled, for example, by catalytic or oxygen degradation processes, as disclosed in U.S. Pat. No. 4,410,693.

Typically, cellulose ethers are prepared by reacting ground cellulose pulp derived from wood, oat hulls or cotton with a concentrated aqueous alkali metal hydroxide solution (hereinafter "caustic solution"). Preferably, the caustic solution is a sodium hydroxide solution containing at least 20, preferably at least 40, more preferably at least 50 weight percent sodium hydroxide. The caustic solution breaks up the crystalline structure of the cellulose, catalyzes the etherification reaction and attaches the ether groups to the cellulose.

The etherifying agents generally are an alkylene oxide, and another agent which is not an alkylene oxide, for example an alkylhalide, halocarboxylic acid, or dialkyl sulfate. However, when preparing ternary-substituted cellulose ethers, a second alkylene oxide can be employed. The agents are chosen based on the type of cellulose ether desired, for example, propylene oxide, and methylene chloride are chosen to prepare hydroxypropyl methylcellulose. The amount of the etherifying agents employed depend on the extent of substitution on the cellulose desired. Generally, a larger amount of the etherifying agents are required to produce a higher substituted cellulose ether.

As used herein, the term "cellulose ether composition" refers to the reaction product between the alkali cellulose and the etherifying agents. Such compositions can be moist from the liquid reagents employed in their preparation, or somewhat dry if the liquid has been removed.

The cellulose ether composition will contain an amount of impurities. Typically, these impurities can be alkali metal salts (e.g., sodium chloride, potassium chloride), glycol ethers, ethers, and unreacted etherifying agents. These impurities can lie in solution with or independently of the liquid which forms the moist product, or they can be solid. The solution containing the impurities can be on the surface of the product as well as in void spaces inside the solid cellulose ether product. Depending on the types of reagents employed, such a solution can be an aqueous or organic solution. If aqueous reagents are employed in preparing the cellulose ether, the aqueous solution containing the impurities can be in the form of a brine solution. Typically, such a brine solution will contain water which was introduced into the reaction when the caustic solution was added.

A suitable filtration device for performing the process comprises a filter and a means for maintaining the cellulose ether composition in a functionally effective thickness. Such a device also comprises a means for allowing an extracting solution to migrate through the thickness of cellulose ether and the filter. For example, the filtration device can be a vertical cylinder with a filter at the bottom end, so that the thickness of the cellulose ether can be supported on the filter, and the extracting solution can be added to the top of the thickness so gravity can pull the extracting solution out through the bottom of the thickness and filter. Likewise, for example, the device can be a horizontal cylinder, and the extracting solution can migrate through by centrifugation, or pressure differential between the ends of the thickness.

Preferably, the filtration device comprises a means for controlling the temperature and/or pressure of the process. Such a means provides a versatility to the process. For example, for those cellulose ethers which are more insoluble at high temperatures, the temperature, and pressure if necessary, can be increased to insolubilize those cellulose ethers. By controlling the pressure, the extracting solution can be either pushed or pulled through the thickness of cellulose ether.

A functionally effective thickness of the cellulose composition can be provided in any manner to the filtration device. Such a manner can be as the moist reaction product, or as a slurry in a solution. Such a thickness can resemble a uniform cake. The thickness is measured in the direction parallel to the direction an extracting solution will be migrating through the cellulose ether composition. The thickness is sufficient such that substantial thickness is maintained when the extracting solution is added and allowed to migrate through the thickness. By "substantial thickness is maintained" is meant that a major amount of the original thickness is preserved after accounting for any agitation which occurred when the extracting solution was added, and for any cellulose ether product which was removed by the extracting solution; and that the extracting solution migrates through the thickness without disturbing its uniformity. The thickness is also sufficient such that a gradient impurity concentration is effected through the thickness of the cellulose ether composition after the extracting solution has been allowed to migrate through it.

A gradient impurity concentration is effected when the impurity concentration of one end of the thickness is different than the impurity concentration of the other end. Such a gradient can be effected when the cellulose ether thickness is sufficient such that the extracting solution can remove a lesser amount of impurities as it migrates further through the thickness. A gradient cannot be effected if the entire thickness of the cellulose ether is agitated by the addition of the extracting solution. The numerical value of the thickness is not critical. All that is required is that the cellulose ether composition be thick enough to effect the gradient.

For example, for a 60 inch high, 14 inch diameter cylinder, a 12 inch thickness of composition is sufficient to effect a gradient impurity concentration. For a 5 foot high, 14 foot diameter cylinder, a composition thickness from about 8 to about 24 inches is sufficient to effect a gradient impurity concentration.

However, the magnitude of the gradient (i.e., the difference in the concentrations at the ends) can depend on the numerical value of the thickness. For example, the larger the thickness, the greater the difference can be between the two concentrations. The impurity concentration of any portion of the thickness can be determined by any known method. For example, a portion of the first end can be removed, dissolved in a solution, and using, for example, silver nitrate titration methods, have its impurity concentration determined. The impurity concentration of the second end, or any other portion of the thickness can be determined in a like manner.

The cellulose ether cake is washed with an extracting solution. The extracting solution comprises a solvent in which the impurities are soluble. For purposes of this invention, the "solvent-soluble impurities" are impurities which form thermodynamically stable mixtures when combined with the solvent. These mixtures form spontaneously and include true solutions in which the individual impurity molecules are dispersed in the solvent as well as micellular or colloidal solutions wherein the impurity molecules are aggregated to some extent, but wherein the aggregates are no larger than colloidal size, and are small enough to pass with the extracting solution through the cellulose ether composition. Preferably the extracting solution can also insolubilize a portion of the cellulose ether.

For example, some water-soluble cellulose ethers are slightly insoluble in aqueous solutions at a basic or acidic pH. The more basic or acidic the solution the more insoluble these cellulose ethers can become. For example, at 95° C., a 4,000 cps hydroxypropyl methylcellulose is 14 percent soluble in a zero percent salt solution, but is only 2 percent soluble in a 20 percent salt solution.

The extracting solution can be an aqueous solution, an organic solvent solution such as an alcohol, or a combination thereof. Advantageously, the extracting solution can be the same type as the solution containing the impurities contained on and in the cellulose ether composition. Thus, the solubility of the impurities in the extracting solution will be ensured.

Preferably, the extracting solution contains an amount of impurities. Such amount can vary from zero percent to saturation, but it is desirable that the impurity concentration of such solution is less than the impurity concentration of the cellulose ether composition.

A cellulose ether composition can be washed more than once with different extracting solutions if desired. More impurities can be removed the more times the composition is washed.

In a one-wash system, an amount of a cellulose ether composition containing impurities is added to a filtration device so that a cake-like thickness of the composition is provided. By "cake-like thickness" is meant that the thickness is substantially uniform. To one end of the cake is added an extracting solution comprising a solvent in which the impurities are soluble. The extracting solution is allowed to migrate through the cake and the filtration device. During the addition and migration of the solution, the thickness of the composition is maintained. To accomplish this objective, the solution is added to the composition so that substantial agitation of the thickness is avoided, and the solution passes through the cake without disturbing the unifomity. Likewise, the addition and migration of the solution is performed so that only a minute amount of the cellulose ether composition is lost.

For example, a minute amount of the cellulose ether composition can be less than about 5, preferably less than about 2, more preferably less than about 1, and most preferably less than about 0.5 percent by weight.

The extracting solution can effect a gradient impurity concentration through the thickness of the composition as it migrates through it. By effecting such a gradient, a counter-current wash system is provided. As the solution extracts impurities from the composition, the more impurity concentrated portion of the solution will contact the more impurity concentrated portion of the composition. Likewise, the lesser impurity concentrated portions of the solution and composition will contact with each other. Therefore, as the solution passes through the composition, the composition "flows" counter-currently relative to the direction of the flow of the solution. After the solution passes through the composition, the composition has a reduced impurity content.

In the preferred embodiment of the invention, the cellulose ether composition is washed more than once with different extracting solutions. It is advantageous to add the cellulose ether composition as a slurry to the filtration device. The slurry solution can be one which insolubilizes a portion of the cellulose ethers. Preferably, such a slurry solution contains an amount of the impurities to be removed from the cellulose ether composition. Slurry addition facilitates adding the composition to the filtration device, and providing a cake-like thickness of the composition when the solution is removed.

Preferably, the filtration device is a vertical cylindrical tank fitted for temperature and pressure control. By employing such a device, gravity can be used to aid the migration of an extracting solution added to the top of the cake. Moreover, the temperature can be increased (and the pressure also, if necessary) above the gel point of the cellulose ethers. Pressure control can also aid the migration of an extracting solution by pushing it through the thickness. However, the pressure should not be increased so that the thickness is compacted, and the extracting solution cannot pass through at all.

Once the cellulose ether composition is provided to the filtration device in the effective thickness, and the temperature and pressure on the device are set at the desired levels, a first extracting solution is added to the top of the thickness. Preferably, the extracting solution is one which insolubilizes a portion of the cellulose ether composition. It is advantageous, that such an extracting solution contain an amount of the impurities contained in the cellulose ether composition. If the slurry solution employed to provide the composition to the device likewise contained the impurities, it is advantageous that the extracting solution contain a lesser impurity concentration than the impurity concentration of the slurry solution. The first extracting solution migrates via gravity and, optionally, the application of pressure through the thickness without disturbing it. The extracting solution can effect a gradient impurity concentration from the top to the bottom of the thickness. The impurity concentration at the top of the thickness is less than the impurity concentration at the bottom.

After being washed with the first extracting solution, the thickness can be washed with a second extracting solution. The second extracting solution, preferably, is the same in all respects as the first extracting solution, except that the second has an initial impurity concentration less than the initial impurity concentration of the first. The second solution is added to the thickness, and migrates through in the same manner as the first, so that the thickness is washed undisturbed, and a gradient impurity concentration is effected.

The thickness can be washed as many times as desired, with as many different extracting solutions as required. It is desirable that each succeeding extracting solution be less concentrated in impurities than the preceeding one.

By washing the thickness with successively weaker in impurity extracting solutions, a dual counter-current wash system is effected. The first counter-current effect is achieved by the extracting solutions migrating through the thickness as discussed above. The second counter-current effect is achieved by employing the successively weaker extracting solutions. As the thickness becomes less concentrated with impurities, it is washed with an extracting solution containing a lesser impurity concentration.

It is desirable, in this multiple wash embodiment, that the individual washes be saved, so that such washes can be used to wash future batches of cellulose ether compositions. For example, the first extracting solution used to wash the composition of one batch, can be saved and used to slurry another batch of a cellulose ether composition. The second extracting solution of one batch can be saved and used as the first extracting solution to wash another batch of a cellulose ether composition. Likewise, if more washes are used, such washes can be reused, and each wash can be used earlier in each succeeding batch.

After the cellulose ether composition has been washed the desired number of times, the composition can be removed from the filtration device in any convenient manner. Such a manner can be, for example, as the moist composition cake, or as a slurry. The composition can be reslurried in water or in a solution having about an equal or less impurity concentration than the final extracting solution employed. The slurry can be removed from the filtration device; the cellulose ether composition and slurry solution separated; optionally, the product washed with hot water, and the final product dried according to known methods. As discussed above, the water or solution used to reslurry and remove the composition from the filter can be saved and recycled.

Recycling the water and solutions provides a method for washing several batches of cellulose ether compositions with a given amount of water. The water and solutions are only discharged when the point of saturation is substantially reached. Therefore, any given amount of water removes the maximum amount of impurities it can. Also, if the extracting solutions containing the impurities insolubilize a portion of the cellulose ether, then any given amount of water can insolubilize the maximum amount of product.

The optimum parameters of the many variables of the process can be determined by known material balance calculations. For example, some of the variables can be: the amount of fresh water used per amount of impurities; the initial concentration of the extracting solution (by "concentration" is meant the amount of the impurities, if any, present in the volume of the solution); the final impurity concentration of the extracting solution after migrating through the thickness; the amount, weight, and height (density) of the thickness; the temperature and pressure at which the process is run; the amount of solution containing impurities in the amount of thickness; the initial impurity concentration in the thickness; the desired final impurity concentration in the thickness; the number of washes (extracting solutions) performed, and the number of theoretical available washing stages. Theoretical available washing stages are the number of washes required using the same amount of extracting solution, without effecting a gradient impurity concentration, to obtain the same impurity concentration in the thickness. Theoretical washing stages primarily depend on the amount of the solution containing impurities in the amount of thickness. They are analogous to extracting stages, and distillation stages as discussed in, for example, *Chemical Engineers Handbook;* R. H. Perry, C. H. Schilton, 5th Edition; McGraw-Hill.

The process of the invention provides a method for removing substantially all of the impurities from cellulose ether compositions without losing a substantial amount of the product. Such purity levels obtained are typically less than about 2, preferably less than about 1, and most preferably less than about 0.5 percent by weight of impurities in the cellulose ether product. Typically, greater than about 95, preferably greater than about 98, and most preferably greater than about 99 percent of the cellulose ether product is recovered. Such yields and purity levels are achieved even for low viscosity, water-soluble cellulose ether products. Such cellulose ethers are not observed to accumulate in holding tanks containing the recycled extracting solutions. Though not intended to be binding, it is believed that the cake-like thickness facilitates the aggregation of these cellulose ethers into insoluble portions.

The following example is intended to be illustrative only, and not to limit the scope of the invention.

EXAMPLE

A hydroxypropyl methylcellulose ether composition having a hydroxypropoxyl molar substitution from about 0.1 to about 0.35, and a methoxyl degree of substitution from about 1.1 to about 1.65, a viscosity measured as 2 percent solution of about 100 cps and a sodium chloride content of about 30 percent is prepared.

A vertical cylindrical filtration device comprising an agitated tank having about a 14 inch diameter, and 60 inch heighth with a screen across the bottom, is fitted for the application of heat and control of pressure.

Batch No. 1

An amount of the cellulose ether concentration is slurried in a solution having an initial sodium chloride concentration of about 12 percent. The slurry has about a 10 percent solids content. To the filtration device is added about five feet of the cellulose ether composition slurry. The temperature on the device is raised to 120° C. and the pressure increased to 10 psig. The slurry solution is filtered off, leaving about a 12 inch cake-like thickness of cellulose ether composition. The slurry filtrate has about a 19 percent sodium chloride concentration. The filtrate is split in two, one portion is discharged, and the other portion is placed into a holding tank (Tank A) for slurrying future batches. An extracting solution initially having about a 3 percent sodium chloride concentration is added, avoiding agitation, to the top of the cake, and allowed to migrate through the cake without disturbing it. The filtrate from this wash has a sodium chloride concentration of about 12 percent, and is added to the above Tank A. A second extracting solution having a sodium chloride concentration of about 0.7 percent is added to the top of the cake, and allowed to migrate through the cake without disturbing it. The filtrate from this wash has a sodium chloride concentration of about 3 percent, and is saved in a separate tank (Tank B) for use as the first extracting solution of future batches. The cake is reslurried with a solution having about a 0.7 percent sodium chloride concentration and removed from the filtration device to a continuous vacuum filter. The reslurry solution is filtered off and saved in a separate tank (Tank C) for use as the second extracting solution in future batches. Optionally, fresh water can be added to Tank C for use as the second extracting or reslurry solution for future batches. The product is dried. The product has an impurity concentration of less than about 1.5 percent by weight, and more than about 97 percent of the product is recovered. About 45.5 pounds of water are used to remove 11.3 pounds of impurities from the cellulose ether composition.

Batch No. 2

An amount of the above prepared hydroxypropyl methylcellulose ether composition is slurried in a solution provided from Tank A which contains the slurry filtrate and first extracting solution filtrate saved from Batch No. 1. The solution has a sodium chloride concentration of about 12 percent. The slurry has about a 10 percent solids content. About 5 feet of the cellulose ether composition slurry is added to the filtration device. The temperature of the device is raised to 120° C. and the pressure increased to 10 psig. The slurry solution is filtered off, leaving about a 12 inch cake-like thickness of the cellulose ether composition. The slurry filtrate has about a 19 percent sodium chloride concentration. The filtrate is split in two, one portion is discharged and the other portion is placed into Tank A. An extracting solution is taken from Tank B, which contains the filtrate of the second extracting solution employed in Batch No. 1. This solution has a sodium chloride concentration of about 3 percent. The solution is added without agitating the cake, and allowed to migrate through without disturbing the cake. The filtrate from this wash has about a 12 percent sodium chloride concentration, and is placed in Tank A. A second extracting solution is taken from Tank C, which contains the reslurry filtrate and/or hot water wash filtrate employed in Batch No. 1. The solution has a sodium chloride concentration of about 0.7 percent, is added, and migrates through the cake in the manner as previous washes. The filtrate from this wash has a sodium chloride concentration of about 3 percent, and is saved in Tank B. As in Batch No. 1, the cellulose ether composition is reslurried, removed from the device to a vacuum filter and dried. The reslurry filtrate, and optionally, fresh water are added in Tank C which also contains the reslurry filtrate employed in Batch No. 1. The product has an impurity concentration of less than about 1.5 percent by weight, and more than 97 percent of the product is recovered. About 45.5 pounds of water are used to remove 11.3 pounds of impurities from the cellulose ether composition.

The example illustrates the efficiency of the process. In the invention, the water washes are reused for future batches and only a portion of the water per batch is discharged. The only time water is removed from the system is when it is about saturated with salt. This high salt concentrated solution has a correspondingly low volume of water. Product losses are reduced because the salt concentration insolubilizes the cellulose ether, and little water is available to remove the cellulose ether. Because the filtration device is fitted for heat application and pressure control, the process can be run well above the gel point temperature of the cellulose ether, ensuring that substantially all of the product is insoluble, and further reducing losses.

What is claimed is:

1. A process for removing solvent-soluble impurities from a cellulose ether composition, said process comprising
   (a) providing a functionally effective thickness of said cellulose ether composition in a filtration device,
   (b) contacting said cellulose ether composition with an extracting solution comprising a solvent for said impurities, in a manner such that said extracting solution can migrate through said thickness of the cellulose ether composition and through said filtration device, and
   (c) allowing said extracting solution to migrate through said thickness of the cellulose ether composition, such that
       (1) substantial thickness of the cellulose ether composition is maintained in the filtration device, and
       (2) a gradient impurity concentration is effected through the thickness.

2. The process of claim 1, wherein the cellulose ether is a water-soluble cellulose ether.

3. The process of claim 2, wherein the impurities comprise sodium chloride.

4. The process of claim 3, wherein the extracting solution can insolubilize a portion of the cellulose ether composition.

5. The process of claim 4, wherein the extracting solution is an aqueous sodium chloride solution.

6. The process of claim 3, wherein the cellulose ether is hydroxypropyl methylcellulose ether.

7. The process of claim 6, wherein the hydroxypropyl methylcellulose has a hydroxypropoxyl molar substitution from about 0.1 to about 0.35, and a methoxyl degree of substitution from about 1.1 to about 1.65.

8. The process of claim 7, wherein the cellulose ether has a viscosity as a 2 percent solution of less than about 10,000 cps.

9. The process of claim 1, wherein the filtration device comprises a vertical cylindrical tank.

10. The process of claim 9, wherein the filtration device comprises a means for controlling temperature.

11. The process of claim 10, wherein the filtration device comprises a means for controlling pressure.

12. The process of claim 1, wherein the extracting solution can insolubilize a portion of the cellulose ether composition.

13. The process of claim 1, further comprising the steps of
    (d) slurrying the cellulose ether composition with a solution comprising a solvent for said impurities;
    (e) removing the cellulose ether composition slurry from said filtration device, and
    (f) isolating the cellulose ether composition from said slurry solution.

14. The process of claim 13, wherein the slurry solution comprises water.

15. The process of claim 1, wherein (b) and (c) are repeated employing a second extracting solution.

16. The process of claim 15, wherein the cellulose ether is a water-soluble cellulose ether.

17. The process of claim 16, wherein the cellulose ether has a viscosity as a 2 percent solution less than about 10,000 cps.

18. The process of claim 15, wherein the extracting solution and the second extracting solution are aqueous solutions.

19. The process of claim 18, wherein the extracting solution and second extracting solution can insolubilize a portion of the cellulose ether composition.

20. The process of claim 19, wherein the extracting solution and the second extracting solution contain an amount of the impurities.

21. The process of claim 20, wherein the second extracting solution contains a lesser concentration of impurities than the extracting solution.

22. The process of claim 21, wherein the impurities comprise sodium chloride.

23. The process of claim 22, wherein the cellulose ether is a water-soluble cellulose ether.

24. The process of claim 23, wherein the cellulose ether is a hydroxypropyl methylcellulose ether.

25. The process of claim 24, wherein the cellulose ether has a hydroxypropoxyl molar substitution from about 0.1 to about 0.35, and a methoxyl degree of substitution from about 1.1 to about 1.65.

26. The process of claim 25, wherein the cellulose ether has a viscosity as a 2 percent solution of less than about 10,000 cps.

27. The process of claim 26, wherein the filtration device comprises a vertical cylindrical tank, a means for controlling temperature, and a means for controlling pressure.

28. The process of claim 27, wherein the cellulose ether composition is provided to the filtration device as a slurry, and which slurry solution is removed after providing said composition to said device.

29. The process of claim 28, wherein the slurry solution contains an amount of the impurities.

30. The process of claim 29, wherein the slurry solution contains a greater amount of impurities than the extracting solution.

31. The process of claim 30, further comprising the steps of (d) slurrying the thickness of cellulose ether composition with water, or a solution containing impurities at a concentration about equal to or less than the impurity concentration contained in the second extracting solution, (e) removing the cellulose ether composition slurry from said filtration device, and (f) isolating the cellulose ether solution from said slurry solution.

* * * * *